United States Patent
Kishi et al.

(10) Patent No.: US 11,796,057 B2
(45) Date of Patent: Oct. 24, 2023

(54) CONTROL METHOD AND CONTROL APPARATUS FOR CONTINUOUSLY VARIABLE TRANSMISSION

(71) Applicant: NISSAN MOTOR CO., LTD., Yokohama (JP)

(72) Inventors: Daigo Kishi, Kanagawa (JP); Toshiaki Motomura, Kanagawa (JP); Tetsuya Shimada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 54 days.

(21) Appl. No.: 17/625,915

(22) PCT Filed: Jul. 11, 2019

(86) PCT No.: PCT/JP2019/027559
§ 371 (c)(1),
(2) Date: Jul. 18, 2022

(87) PCT Pub. No.: WO2021/005791
PCT Pub. Date: Jan. 14, 2021

(65) Prior Publication Data
US 2022/0356947 A1 Nov. 10, 2022

(51) Int. Cl.
*F16H 61/66* (2006.01)
*F16H 61/662* (2006.01)
(Continued)

(52) U.S. Cl.
CPC ....... *F16H 61/66231* (2013.01); *F16H 59/36* (2013.01); *F16H 59/70* (2013.01);
(Continued)

(58) Field of Classification Search
CPC .......... F16H 59/36; F16H 59/70; F16H 59/18; F16H 2059/366; F16H 2059/704; F16H 61/66231; F16H 2061/6615
See application file for complete search history.

(56) References Cited

U.S. PATENT DOCUMENTS 4,353,272 A * 10/1982 Schneider ............. B60W 10/10
477/110
5,616,091 A * 4/1997 Warren ................... F16H 47/04
475/82
(Continued)

FOREIGN PATENT DOCUMENTS

CN  101275669 A  10/2008
JP  2001-021031 A  1/2001
(Continued)

*Primary Examiner* — Edwin A Young
(74) *Attorney, Agent, or Firm* — Foley & Lardner LLP

(57) ABSTRACT

The control method for the continuously variable transmission in the present invention detects a magnitude of an acceleration request, and when the acceleration request exceeds a preset threshold value, the control method controls a transmission ratio by switching from a first shift mode, in which a target transmission ratio is changed steplessly, to a second shift mode, which includes a stepwise change in the target transmission ratio. Then, when executing the second shift mode, a target engine rotation speed is set according to the magnitude of the acceleration request, and a step-down shift, in which the target transmission ratio is lowered stepwise according to the target engine rotation speed, is executed at an acceleration start time, and the target engine rotation speed after executing the step-down shift is retained for a predetermined period.

5 Claims, 7 Drawing Sheets

(51) Int. Cl.
 *F16H 59/36* (2006.01)
 *F16H 59/70* (2006.01)
(52) U.S. Cl.
 CPC .. *F16H 2059/366* (2013.01); *F16H 2059/704* (2013.01); *F16H 2061/6615* (2013.01)

(56) References Cited

U.S. PATENT DOCUMENTS

2008/0242500 A1   10/2008   Asaoka
2020/0158233 A1*  5/2020   Komuro ................ F16H 59/044

FOREIGN PATENT DOCUMENTS

| | | |
|---|---|---|
| JP | 2004-125072 A | 4/2004 |
| JP | 2008-275142 A | 11/2008 |
| JP | 2013-170527 A | 9/2013 |
| JP | 2016-014406 A | 1/2016 |

\* cited by examiner

CONTROL METHOD AND CONTROL APPARATUS FOR CONTINUOUSLY VARIABLE TRANSMISSION

TECHNICAL FIELD

The present invention relates to control for a continuously variable transmission.

BACKGROUND ART

As a vehicle transmission, there is known a continuously variable transmission in which the transmission ratio is changed steplessly to transmit the rotation speed of engine to drive wheels. As a control for the continuously variable transmission, there is known a configuration in which the shift pattern according to the driver's accelerator pedal operation amount and vehicle speed is stored in a controller as a map of a target input shaft rotation speed, which is the target rotation speed of the input shaft of the continuously variable transmission, and a target transmission ratio is set based on the target input shaft rotation speed according to the driving state. In addition, when the driver performs a kickdown operation that rapidly increases the accelerator pedal operation amount with the intention of sudden acceleration, conventionally, a control has been performed to increase the target transmission ratio stepwise in order to increase the engine rotation speed sharply according to the accelerator pedal operation amount.

JP2004-125072A discloses accelerating the vehicle by repeating a control, which stepwise increases the target transmission ratio, and a control that reduces the target transmission ratio stepwise to lower the input shaft rotation speed when the input shaft rotation speed reaches an upper limit afterwards when a kickdown operation is performed.

SUMMARY OF INVENTION

However, the controls disclosed by the above document increase the target transmission ratio stepwise and then increase the target transmission ratio along a transmission ratio fixation line from an increased operating point, and thus, in the early stage of acceleration, the controls give the driver a sense of discomfort that the increase in vehicle speed is slow even though the engine rotation speed is increasing. Therefore, the object of the present invention is to further improve the feeling of acceleration.

According to one embodiment of the present invention, a control method for a continuously variable transmission comprises: detecting a magnitude of an acceleration request; and controlling a transmission ratio by switching from a first shift mode, in which a target transmission ratio is changed steplessly, to a second shift mode, which includes a stepwise change in the target transmission ratio, when the acceleration request exceeds a preset threshold value. When executing the second shift mode, a target engine rotation speed is set according to the magnitude of the acceleration request, a step-down shift that lowers the target transmission ratio stepwise according to the target engine rotation speed is executed at an acceleration start time, and the target engine rotation speed after the execution of the step-down shift is retained for a predetermined period.

DESCRIPTION OF EMBODIMENTS

Hereinafter, embodiments of the present invention will be described with reference to the drawings.

Figure 1:
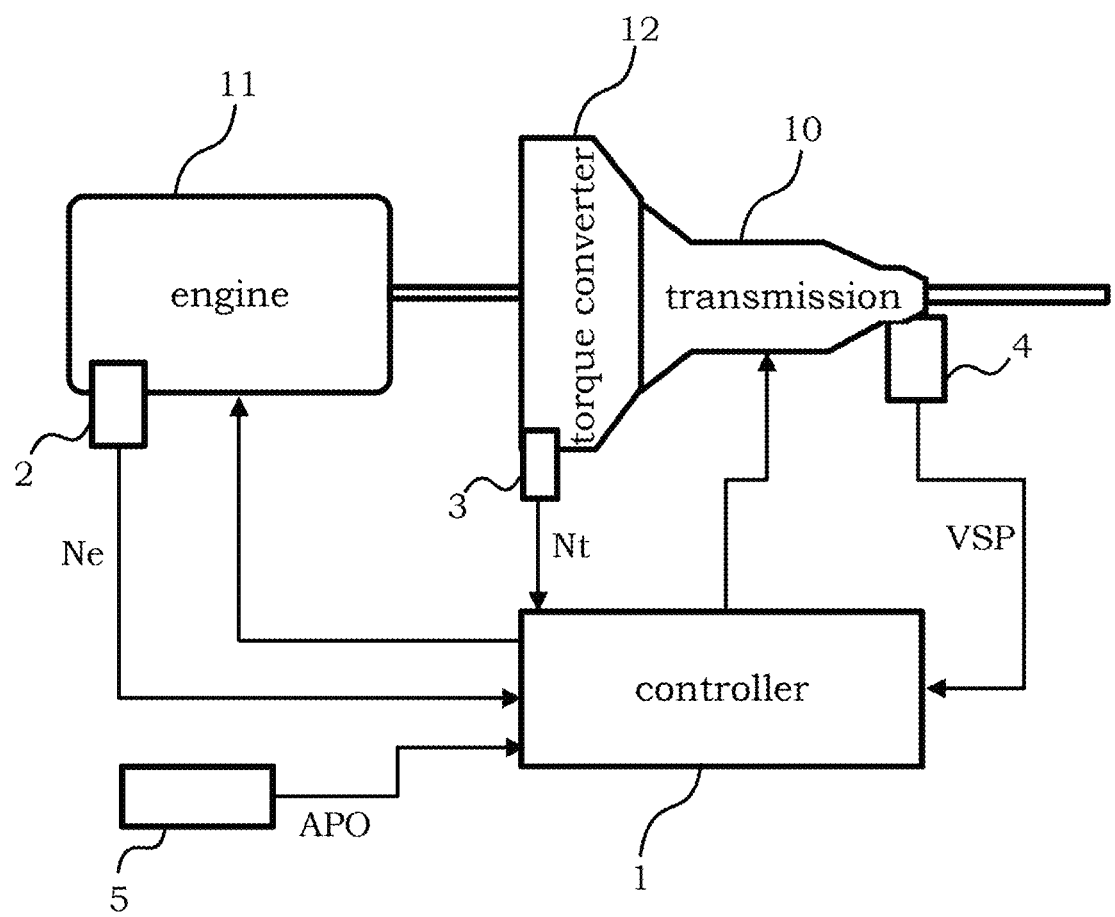
FIG. 1 is a block diagram illustrating a schematic configuration of a vehicle.

FIG. 1 is a block diagram focusing on a control apparatus for a continuously variable transmission of a vehicle according to this embodiment.

A continuously variable transmission 10 having a torque converter 12 is connected to an engine 11.

The engine 11 and the continuously variable transmission 10 are provided with a controller 1 as a controlling unit that controls the transmission ratio of the continuously variable transmission 10 and the output of the engine 11 so that the driving state is suitable for the traveling state. Further, a so-called V-belt type or a toroidal type may be employed as the continuously variable transmission mechanism of the continuously variable transmission 10.

The controller 1 performs a fuel injection amount control, an ignition timing control, and the like, of the engine 11 in accordance with the driving state. In addition, the controller 1 controls the rotation speed of the engine 11 by controlling the transmission ratio of the continuously variable transmission 10 according to the driving state.

The controller 1 is connected to an accelerator pedal opening sensor 5 that detects the driver's accelerator pedal operation amount, an engine rotation speed sensor 2 that detects the engine rotation speed Ne of the engine 11, an input shaft rotation speed sensor 3 that detects the input shaft rotation speed Nt of the continuously variable transmission 10, and an output shaft rotation speed sensor 4 that detects the output shaft rotation speed Out Rev of the continuously variable transmission 10. The controller 1 detects the driving state of the vehicle from each of the values obtained from these sensors. Further, the traveling speed of the vehicle (hereinafter referred to as "vehicle speed VSP") is, for example, detected by detecting the output shaft rotation speed Out Rev of the continuously variable transmission 10 and multiplying this value by a constant (tire radius, etc.) corresponding to the vehicle specification or a final reduction ratio. In other words, the output shaft rotation speed sensor 4 also functions as a vehicle speed sensor.

In addition, the controller 1 is configured of a microcomputer including a central processing unit (CPU), a read-only memory (ROM), a random-access memory (RAM), and an input-output interface (I/O interface). The controller 1 may be constituted by a plurality of microcomputers.

Meanwhile, since the input shaft rotation speed Nt of the continuously variable transmission 10 and the engine rotation speed Ne can be considered to be the same when the torque converter 12 is in a lock-up state, the description below will be given using the engine rotational speed Ne.

Next, the transmission ratio control of the continuously variable transmission 10 programmed in the controller 1 will be described.

As a general rule, the controller 1 executes the first shift mode in which the target transmission ratio is changed steplessly according to the driving state. The traveling state that executes the first shift mode is referred to as normal traveling.

During normal traveling, the controller 1 detects the magnitude of the acceleration request based on the value detected by the accelerator pedal opening sensor 5 which is an acceleration request detecting unit. Specifically, an accelerator pedal depression amount is detected. Thus, when the accelerator pedal depression amount exceeds a preset threshold value, the controller 1 determines that the acceleration request is large. The threshold value here can be set arbitrarily. For example, set the threshold value to be ½ of the opening when the accelerator pedal opening is fully opened. Further, in this embodiment, the magnitude of the acceleration request is determined based on the accelerator pedal opening, but it may also be determined based on the throttle valve opening that correlates with the accelerator pedal opening.

If the controller 1 determines that the acceleration request is large, it switches from the first shift mode to the second shift mode including the stepwise change of the target transmission ratio in order to realize the acceleration according to the acceleration request. Specifically, the controller 1 calculates the target engine rotation speed according to the accelerator pedal depression amount, and sets the target transmission ratio according to this target engine rotation speed (that is, the target transmission ratio according to the acceleration request). Then, the controller 1 changes the target transmission ratio stepwise from the current target transmission ratio to the target transmission ratio according to the acceleration request. The target transmission ratio corresponding to the acceleration request referred to here is a transmission ratio on the low side as compared with the current target transmission ratio. That is, the above-mentioned stepwise change in the transmission ratio means a stepwise downshift (hereinafter also referred to as step-down shift).

Performing a step-down shift when the acceleration request is large is a conventionally known control. However, the conventionally known control is to execute a step-down shift at the acceleration start time, and then increase the target engine rotation speed in a state of retaining the target transmission ratio after the step-down shift. In other words, the target engine rotation speed increases stepwise due to the step-down shift, and continues to increase thereafter. In this control, the driver is given a so-called blow-up feeling. The blow-up feeling here is the feeling that the vehicle speed does not increase even though the engine rotation speed is increasing due to the fact that the change amount of the actual engine rotation speed is excessively large with respect to the change amount of the acceleration.

Thus, in order to suppress the blow-up feeling, once the controller 1 of this embodiment lowers the target transmission ratio stepwise, the controller 1 retains a constant target engine rotation speed for a predetermined period thereafter. The "predetermined period" here is the period until the actual engine rotation speed converges to the target engine rotation speed. Further, even if the actual engine rotation speed does not actually converge, the difference between the actual engine rotation speed and the target engine rotation speed is converged to from several tens to several hundreds, and if the increasing speed of the actual engine rotation speed is less than or equal to a preset threshold value, the actual engine rotation speed is considered to be "converged". Hereinafter, the period during which the target engine rotation speed is retained constant is also referred to as the "retention period".

Further, after the retention period has elapsed, the transmission ratio may be fixed, but this slows down the increasing speed of the actual engine rotation speed, and the driver may be dissatisfied with the feeling of acceleration. Thus, the controller 1 of this embodiment further increases the increasing speed of the engine rotation speed by gradually changing the target transmission ratio in the downshift direction after the retention period elapses.

Figure 2:
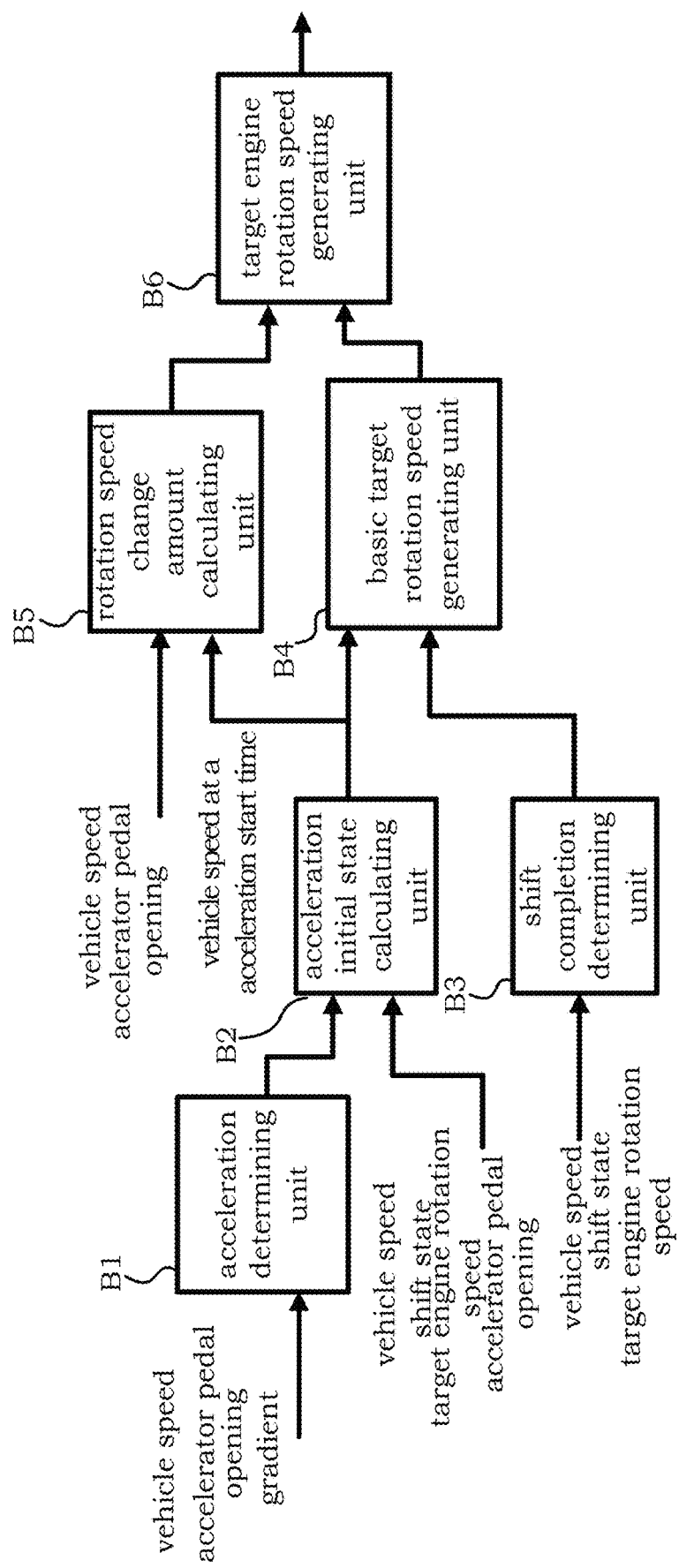
FIG. 2 is a control block diagram for generating a target engine rotation speed for acceleration.

FIG. 2 is a control block diagram of a control in which a retention period is provided and the target transmission ratio is gradually changed in the downshift direction after the retention period elapses. Note that each block shows the transmission ratio control function of the controller 1 as a virtual unit, and does not mean a physical existence.

Figure 3:
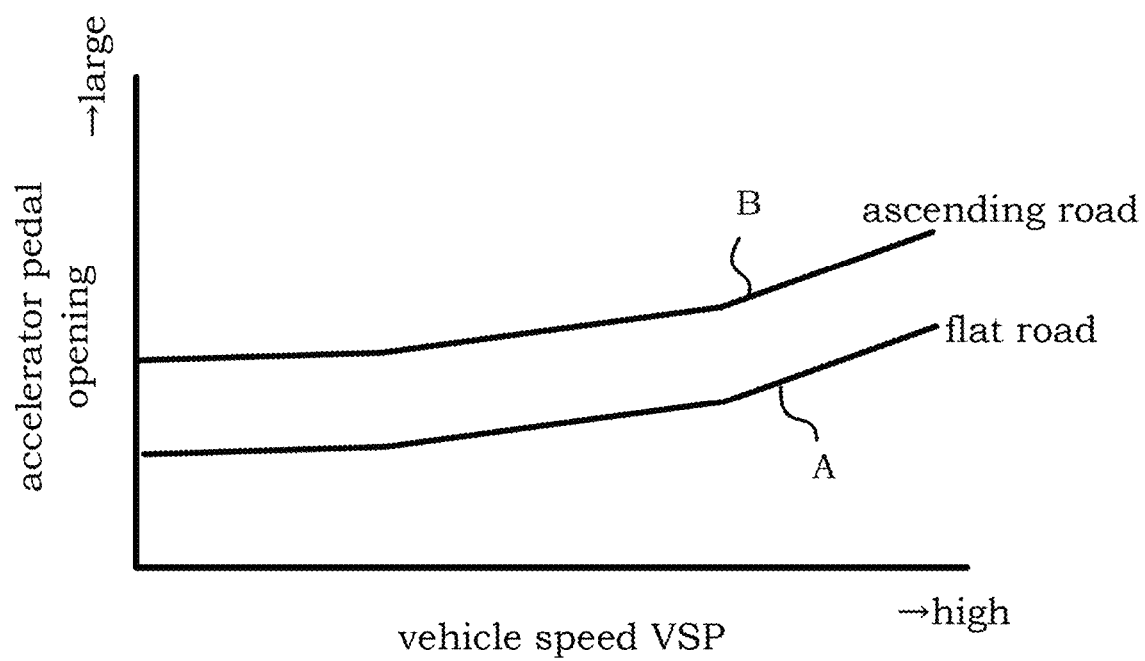
FIG. 3 is a map used for determining shift mode switching.

The acceleration determining unit B1 determines whether or not to switch from the first shift mode to the second shift mode based on the read vehicle speed, the accelerator pedal opening and the gradient of the road surface on which the vehicle is traveling. Specifically, the determination is made using the map shown in FIG. 3. In FIG. 3, the vertical axis is the accelerator pedal opening, the horizontal axis is the vehicle speed VSP, the solid line A is the switching threshold value for flat road, and the solid line B is the switching threshold value for ascending road. The acceleration determining unit B1 determines whether the road surface on which the vehicle is currently traveling is flat road or ascending road from the read gradient, and if it is flat road, the acceleration determining unit B1 determines to switch to the second shift mode once the accelerator pedal opening exceeds the switching threshold value for flat road. If it is ascending road, the acceleration determining unit B1 determines to switch to the second shift mode once the accelerator pedal opening exceeds the switching threshold value for ascending road. Further, the switching threshold value for ascending road is larger than the switching threshold value for flat road because the accelerator pedal opening is larger for ascending road when trying to obtain the same acceleration.

Figure 4:
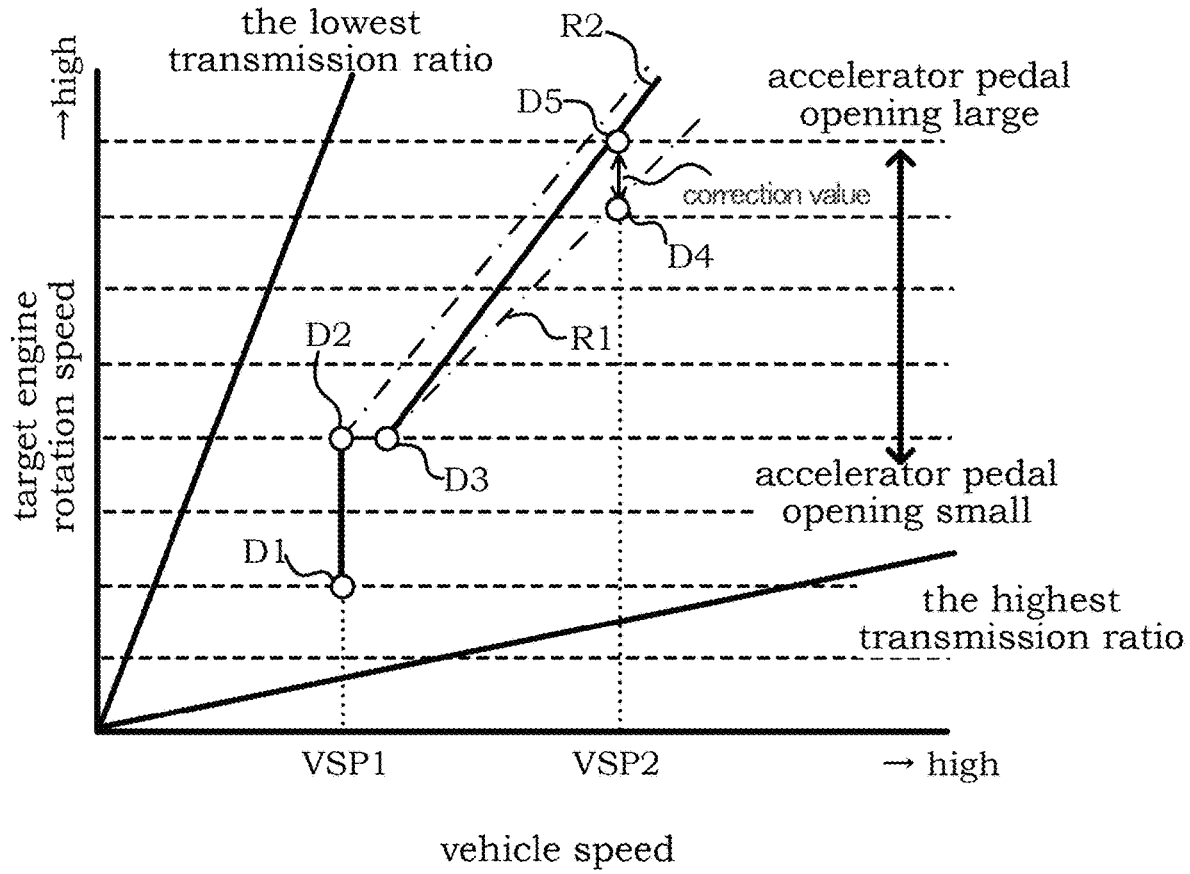
FIG. 4 is a shift schedule diagram showing an example of shift control of the present invention.

The acceleration initial state calculating unit B2 calculates the operating point of the step-down shift destination and the vehicle speed at the start of the step-down shift (the vehicle speed at the acceleration start time) based on the determination result of the acceleration determining unit B1, the vehicle speed, the shift state (for example, the actual transmission ratio), the target engine rotation speed, and the accelerator pedal opening. That is, when the current operating point is D1 in the shift line diagram in FIG. 4, the acceleration initial state calculating unit B2 calculates the operating point D2 of the step-down shift destination, the operating point D3 at the start of the step-down shift, and the vehicle speed VSP1 at the end of the retention period. Further, in FIG. 4, the broken line is an equal accelerator pedal opening line, and the dashed-dotted line is a transmission ratio fixation line.

The shift completion determining unit B3 determines whether or not the retention period has ended based on the vehicle speed, the shift state (for example, the actual transmission ratio) and the target engine rotation speed.

The basic target rotation speed generating unit B4 generates a basic target rotation speed, which is the basic target value of the engine rotation speed after the retention period ends, based on the calculation result of the acceleration initial state calculating unit B2 and the determination result of the shift completion determining unit B3. The "basic target value" is the target value before being corrected by a process to be described later.

More specifically, the basic target rotation speed generating unit B4 generates the target rotation speed from the operating point D2 at the time of step-down shift to the operating point D3 at the end of the retention period, and generates the target rotation speed toward which the engine rotation speed increases as the vehicle speed VSP increases along the transmission ratio fixation line R1 from the operating point D3 at the end of the retention period.

Figure 5:
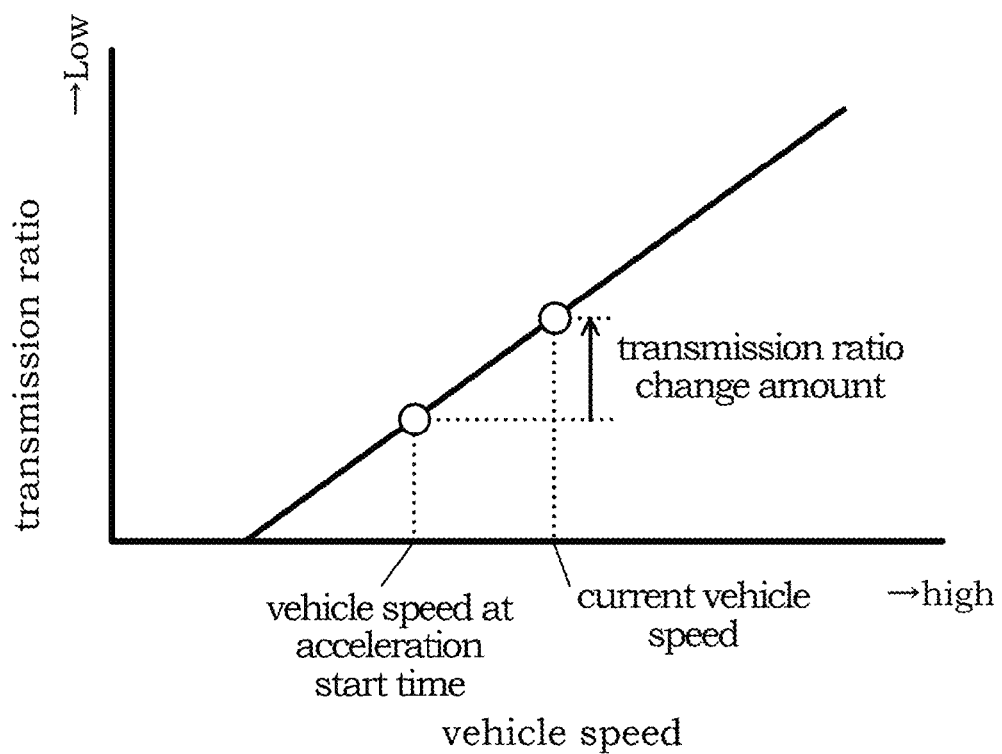
FIG. 5 is a diagram for explaining a transmission ratio change amount.

The rotation speed change amount calculating unit B5 calculates the rotation speed change amount based on the vehicle speed, the accelerator pedal opening, and the vehicle speed at the acceleration start time calculated by the acceleration initial state calculating unit B2. The rotation speed change amount here is a correction value for correcting the change amount of the basic target rotation speed. Specifically, the correction value is calculated, making the target engine rotation speed higher than the basic target rotation speed and the ratio of the increase amount of the engine rotation speed to the increase amount of the vehicle speed equal to or less than a preset upper limit ratio. That is, calculate the correction value for correcting the target engine rotation speed along the transmission ratio fixation line R1 to the transmission ratio line R2 indicated by the solid line in FIG. 4. The map shown in FIG. 5 is used for the calculation of the correction value. In FIG. 5, the vertical axis is the transmission ratio, and the horizontal axis is the vehicle speed VSP. As shown by the arrow in FIG. 5, as the current vehicle speed VSP increases, the transmission ratio shift amount which accompanies the change in vehicle speed becomes larger. The change amount of the transmission ratio is converted to an engine rotation speed which is the correction value of the change amount of the target engine rotation speed.

Limiting the rotation speed change amount in a manner that the ratio of the increase amount of the engine rotation speed to the increase amount of the vehicle speed is equal to or less than a preset upper limit ratio is to prevent giving the driver a blow-up feeling. The upper limit ratio here is a value that can prevent giving a blow-up feeling, and the value is determined by the relation between the acceleration and the increasing speed of the engine rotation speed. For example, even with the same increasing speed of the engine rotation speed, a blow-up feeling will be given if the acceleration is low, and a blow-up feeling will not be given if the acceleration is high. Thus, the specific value of the upper limit ratio is set based on data collected by experiments, etc.

The target engine rotation speed generating unit B6 generates the target engine rotation speed by adding the rotation speed change amount calculated by the rotation speed change amount calculating unit B5 to the basic target rotation speed generated by the basic target rotation speed generating unit B4. For example, when the current vehicle speed is VSP2, the operating point based on the basic target rotation speed is D4, and the operating point D5, which is the sum of this and the rotation speed change amount ("correction value" in the figure), is the operating point based on the target engine rotation speed. The transmission ratio line R2 can be obtained by repeating the above calculation.

Figure 6:
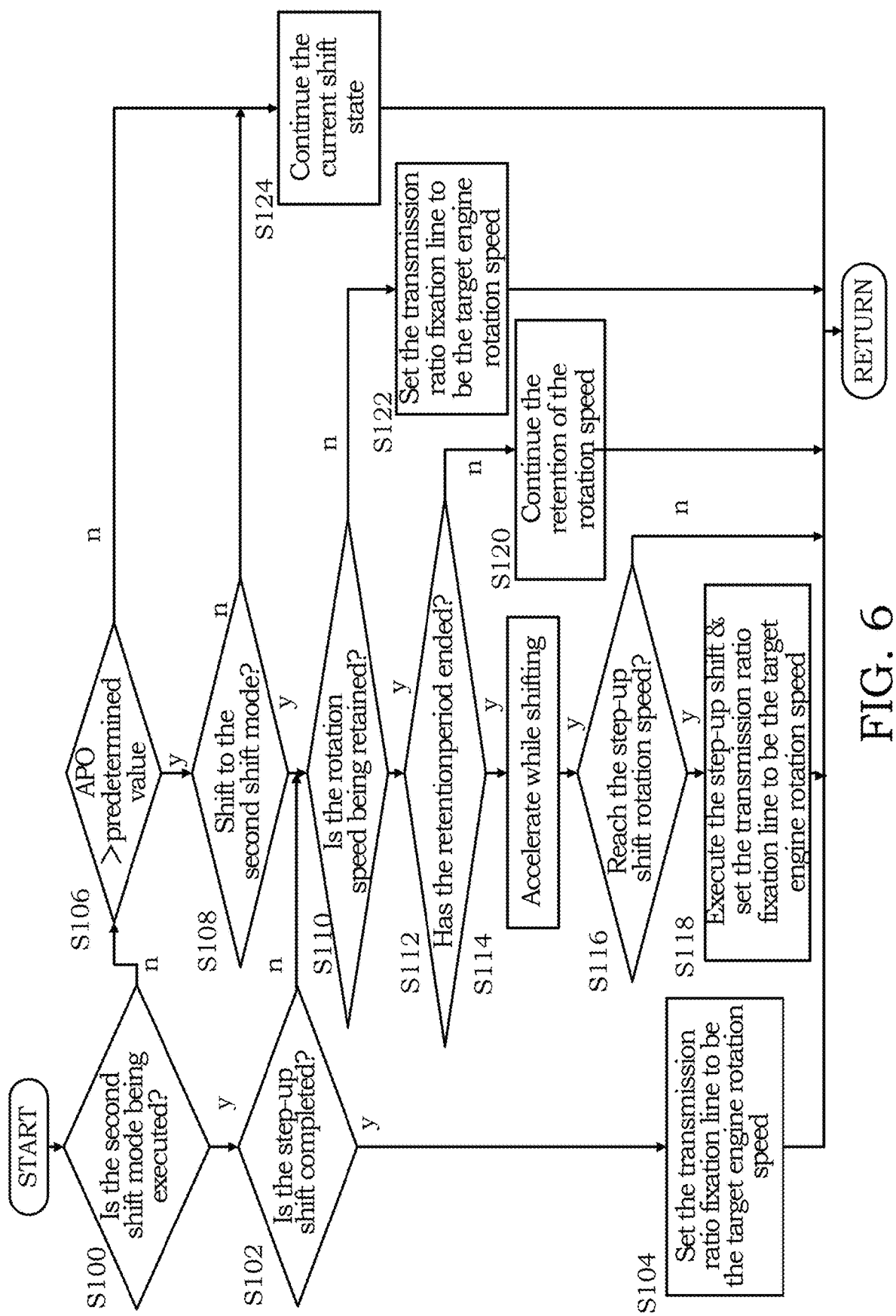
FIG. 6 is a flowchart showing a control routine of shift control of the present invention.

Next, the control routine of shift control according to this embodiment including the aforementioned control will be described with reference to FIG. 6. The control routine shown in FIG. 6 is programmed in the controller 1 and is repeatedly executed at short intervals of, for example, several milliseconds.

In Step S100, the controller 1 determines whether or not the second shift mode is currently being executed, executes the process of Step S102 if the second shift mode is being executed, and executes the process of Step S106 if the second shift mode is not being executed. Since the controller 1 determines the switching between the first shift mode and the second shift mode, the determination of this Step can be made by reading the current state.

In Step S102, the controller 1 determines whether or not a step-up shift has been executed at least once after switching to the second shift mode. If a step-up shift has been executed, the process of Step S104 is executed, and if a step-up shift has not been executed, the process of Step S110 is executed.

In Step S104, the controller 1 sets the transmission ratio fixation line to be the target engine rotation speed. In other words, when accelerating from the current operating point, the target engine rotation speed is set to be a rotation speed which increases as the vehicle speed VSP increases along the transmission ratio fixation line.

If it is determined in Step S100 that the second shift mode is not being executed, the controller 1 determines in Step S106 whether or not the accelerator pedal opening APO is greater than a predetermined value. The predetermined value here is the switching threshold value for flat road used in the acceleration determining unit B1. If the determination result is yes, the process of Step S108 is executed, and if the determination result is no, the process of Step S124 is executed. In Step S124, the controller 1 continues the current shift state.

In Step S108, the controller 1 determines whether or not to shift to the second shift mode. When the vehicle is traveling on a flat road, since it is known in Step S106 that the accelerator pedal opening APO exceeds the switching threshold value for flat road, the controller 1 determines to shift to the second shift mode. When the vehicle is traveling on an ascending road, the accelerator pedal opening APO is compared with the switching threshold value for ascending road, and if the accelerator pedal opening APO is larger, the controller 1 determines to shift to the second shift mode, and if the accelerator pedal opening APO is less than or equal to the switching threshold value for ascending road, the controller 1 determines not to shift to the second shift mode.

When the controller 1 determines to shift to the second shift mode, the controller 1 switches to the second shift mode and then executes the process of Step S110. On the other hand, when the controller 1 determines not to shift to the second shift mode, the controller 1 executes the process of Step S124 as it is.

Further, the aforementioned processes in Steps S106 and S108 correspond to the aforementioned processes in the acceleration determining unit B1.

In Step S110, the controller 1 determines whether or not it is during the retention period of the target engine rotation speed after the step-down shift. Since it is the controller 1 that sets the target engine rotation speed, the controller 1 can make that determination based on the current control state. If it is during the retention period, the process of Step S112 is executed, and if not, the process of Step S122 is executed. In Step S122, the controller 1 sets the transmission ratio fixation line to be the target engine rotation speed as in Step S104.

In Step S112, the controller 1 determines whether or not the retention period has ended. Specifically, as described above, it is determined that the retention period has ended when a predetermined time has elapsed after the actual engine rotation speed converges to the target engine rotation speed or the actual transmission ratio reaches the target transmission ratio. Then, if the retention period has ended, the controller 1 executes the process of Step S114. If the retention period has not ended, the controller 1 continues to retain the target engine rotation speed in Step S120. Further, the process in this Step corresponds to the aforementioned process in the shift completion determining unit B3.

In Step S114, the controller 1 sets the target engine rotation speed so that the amount of increase in engine rotation speed with respect to the amount of increase in vehicle speed does not give the driver a blow-up feeling, and accelerates the vehicle while downshifting steplessly and continuously. The target engine rotation speed here is the target engine rotation speed generated by the aforementioned target engine rotation speed generating unit B6.

In Step S116, the controller 1 determines whether or not the actual engine rotation speed has reached the step-up shift rotation speed. If the actual engine rotation speed has reached the step-up shift rotation speed, the process of Step S118 is executed, and if the actual engine rotation speed has not reached the step-up shift rotation speed, the current routine is terminated as it is. The step-up shift rotation speed is preset for each accelerator pedal opening and stored in the controller 1.

In Step S118, the controller 1 executes the step-up shift and sets the transmission ratio fixation line to be the target engine rotation speed as in Step S104.

Figure 7:
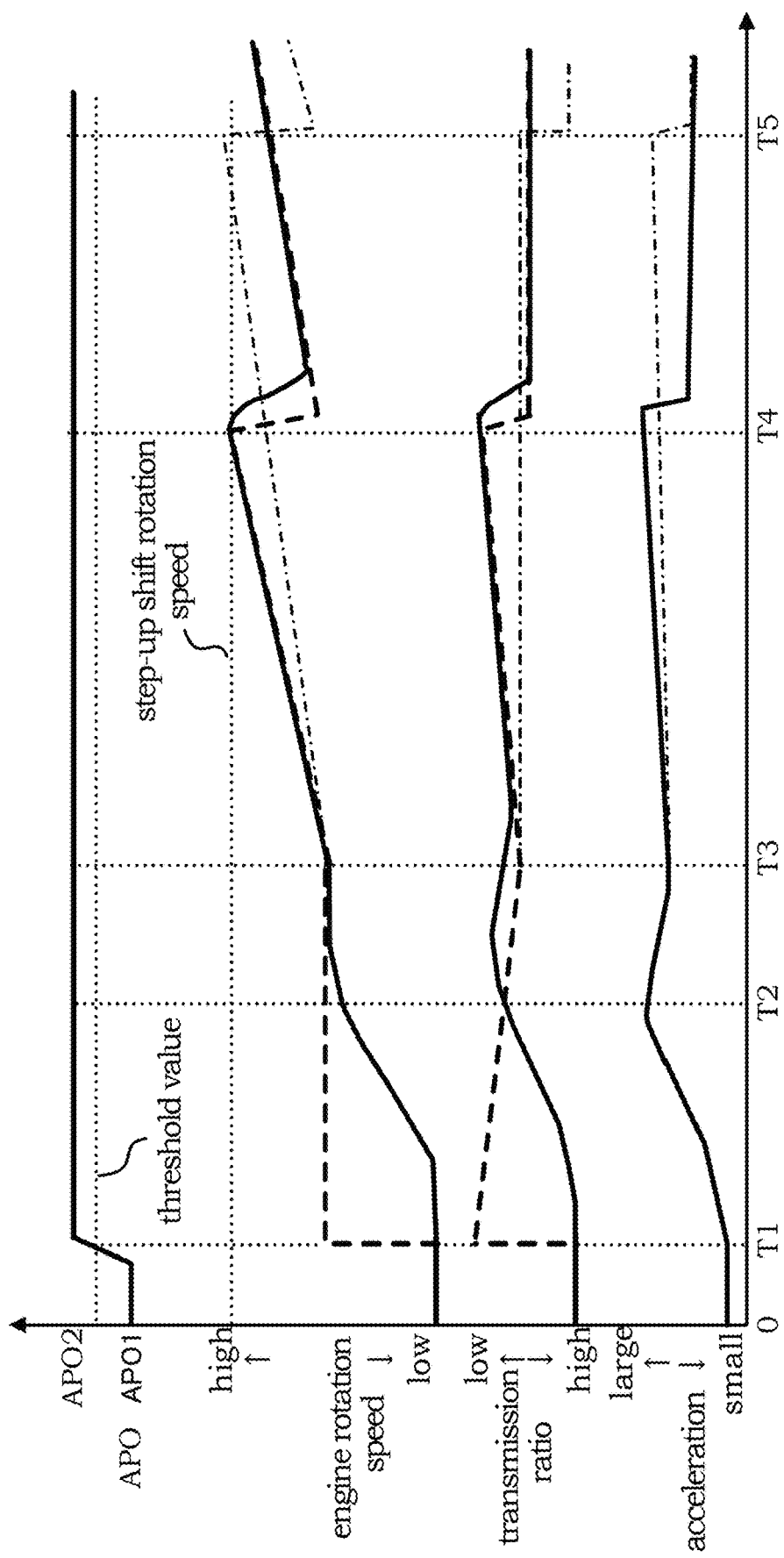
FIG. 7 is a timing chart of a case of executing a control of the present invention.

FIG. 7 is an example of timing chart when the control routine of FIG. 6 is executed in the case where the accelerator pedal is depressed until the accelerator pedal opening becomes APO2 during the traveling of the vehicle with an accelerator pedal opening of APO1. In the engine rotation speed and transmission ratio charts, the solid lines indicate actual values, and the broken lines indicate target values. In addition, the dashed-dotted lines in these charts indicate values when the transmission ratio fixation line is set to be the target engine rotation speed after the end of the retention period.

When the accelerator pedal opening APO exceeds the threshold value for determining the switch to the second shift mode at the timing T1, the shift mode is switched from the first shift mode to the second shift mode, and the target engine rotation speed is set according to the accelerator pedal opening. The target transmission ratio changes stepwise to the low side (that is, downshifts) according to the target engine rotation speed.

After the timing T1, the actual engine rotation speed increases toward the target engine rotation speed, and the actual transmission ratio also changes to the low side toward the target transmission ratio. These also increase acceleration. Further, the vehicle speed increases as the acceleration increases, but since the target engine rotation speed is constant, the target transmission ratio gradually changes to the high side (that is, upshifts) as the vehicle speed increases.

At the timing T2, the actual transmission ratio reaches the target transmission ratio. At this time, the actual engine rotation speed is not converged to the target engine rotation speed due to the delay in the increase of the vehicle speed, and the retention period, during which the target engine rotation speed is retained constant, is continued for a predetermined time.

Then, the predetermined time elapses after the actual transmission ratio reaches the target transmission ratio, and the retention period ends at the timing T3 when the actual engine rotation speed is converged to the target engine rotation speed. In other words, the target engine rotation speed is retained constant for the predetermined time after the actual transmission ratio reaches the target transmission ratio. In this way, it is possible to clearly separate the increase in rotation during the step-down shift from the increase in rotation during the acceleration after the step-down shift (that is, to make the difference easier to feel) to improve the comfort of driving and riding.

After the timing T3, the vehicle accelerates while increasing the target rotation speed by the process of Step S114 in FIG. 6. At that time, the target transmission ratio gradually changes to the low side (that is, gradually downshifts).

A step-up shift is performed at the timing T4 when the actual engine rotation speed reaches the step-up shift rotation speed. Then, after performing step-up shift once, acceleration is continued with the target transmission ratio fixed.

Meanwhile, if the transmission ratio fixation line is set to be the target engine rotation speed from the timing T1 without setting the retention period from the timing T1 to the timing T3, the actual engine rotation speed continues to rise without slowing down from the start of the step-down shift until the upshift rotation speed is reached. This gives the driver a blow-up feeling.

On the other hand, in this embodiment, the retention period is set to be from the timing T1 to T3, and the target engine rotation speed is retained constant, and thus, the rise of the actual acceleration slows down from the timing T2 to T3 and the actual acceleration rises again after the timing T3. This allows the driver to clearly distinguish between an increase in engine rotation speed due to a step-down shift and an increase in engine rotation speed for subsequent acceleration, and does not give the driver a blow-up feeling. In other words, the feeling of acceleration is improved.

Further, if the target transmission ratio is fixed after the timing T3 as shown by the dashed-dotted line in the figure, the timing of executing the step-up shift becomes the timing T5 which is later than the timing T4. In other words, according to this embodiment, the acceleration force can be improved by accelerating while downshifting after the end of the retention period.

If the interval from the timing T3 to the timing T4 is excessively short, the driver will be given a blow-up feeling. However, in this embodiment, the rotation speed change amount is limited in a manner that the change amount of the target engine rotation speed with respect to the increase in the vehicle speed is equal to or less than a predetermined value, and thus, the driver is not given a blow-up feeling.

Setting the transmission ratio fixation line to be the target engine rotation speed without downshifting after performing the step-up shift once is to prevent giving the driver a blow-up feeling. That is, the reason is that if the vehicle is accelerated while downshifting, the increasing speed of the engine rotation speed increases, but if this is continued even after the step-up shift, the driver may be given a blow-up feeling. Further, in Steps S104, S118, and S122, instead of setting the transmission ratio fixation line to be the target engine rotation speed, acceleration may be performed while downshifting as in Step S114. However, in those cases, the change amount of the transmission ratio is made smaller than that of Step S114 so as not to give the driver a blow-up feeling.

The effect of this embodiment will be summarized next.

In this embodiment, the magnitude of the acceleration request is detected, and when the acceleration request exceeds the preset threshold value, the transmission ratio is controlled by switching from the first shift mode, in which the target transmission ratio is changed steplessly, to the second shift mode, which includes a stepwise change in the target transmission ratio. Then, when executing the second shift mode, a target engine rotation speed is set according to the magnitude of the acceleration request, and a step-down shift, in which the target transmission ratio is lowered stepwise according to the target engine rotation speed, is executed at an acceleration start time, and the target engine rotation speed after executing the step-down shift is retained for a predetermined period. Thereby, the increase in engine rotation speed due to step-down shift and the increase in engine rotation speed due to acceleration can be separated from each other, and thus, the driver is not given a blow-up feeling and the feeling of acceleration is improved.

The aforementioned predetermined period in this embodiment is the period until the actual engine rotation speed is converged to the target engine rotation speed. Thereby, after the step-down shift is completed, the increase in engine rotation speed due to acceleration starts, and thus, the aforementioned separation between the increases in engine rotation speed becomes clearer.

In this embodiment, after the predetermined period has elapsed, the vehicle accelerates while being gradually downshifted. After the step-down shift, the vehicle is upshifted to retain a constant target engine rotation speed for a predetermined time, but by accelerating while downshifting after the elapse of the predetermined time, the decrease in acceleration due to the aforementioned upshift is offset and the acceleration force is improved.

In this embodiment, the vehicle is accelerated while gradually lowering the target transmission ratio, and when the actual engine rotation speed reaches a preset upshift rotation speed, a step-up shift, in which the transmission ratio is increased stepwise, is executed. Then, after executing the step-up shift, the change amount of the target transmission ratio is made smaller than that before executing the step-up shift. Thereby, since the accelerator pedal depression amount by the driver is coordinated with the acceleration, it is possible to prevent giving the driver a blow-up feeling.

In this embodiment, the downshift amount when gradually downshifting is set to a magnitude such that the ratio of the increase amount of the target engine rotation speed to the increase amount of the vehicle speed is smaller than a preset upper limit ratio. Thereby, the driver is not given a blow-up feeling, and the feeling of acceleration is improved.

While the embodiments of the present invention have been described above, the above-described embodiments only show part of application examples of the present invention and are not intended to limit the technical scope of the present invention to the specific configurations of the above-described embodiments.

The invention claimed is:

1. A control method for a continuously variable transmission, the control method comprising:
   detecting a magnitude of an acceleration request; and
   controlling a transmission ratio by switching from a first shift mode, in which a target transmission ratio is changed steplessly, to a second shift mode, which includes a stepwise change in the target transmission ratio, when the acceleration request exceeds a preset threshold value, wherein:
   the control method comprises, when executing the second shift mode:
   setting a target engine rotation speed according to the magnitude of the acceleration request,
   executing a step-down shift that lowers the target transmission ratio stepwise according to the target engine rotation speed at an acceleration start time, and
   retaining the target engine rotation speed after the execution of the step-down shift for a predetermined period; wherein:
   the predetermined period is a period until an actual engine rotation speed is converged to the target engine rotation speed, or a period from a start of the step-down shift until a predetermined time elapses after an actual transmission ratio due to the step-down shift reaches the target transmission ratio.

2. The control method for the continuously variable transmission according to claim 1, wherein
   acceleration is performed while steplessly and continuously downshifting after the predetermined period has elapsed.

3. The control method for the continuously variable transmission according to claim 2, wherein
   acceleration is executed while steplessly and continuously lowering the target transmission ratio;
   a step-up shift that increases the transmission ratio stepwise is executed when the actual engine rotation speed reaches a preset upshift rotation speed; and
   after executing the step-up shift, downshift is executed by a change amount of the target transmission ratio which is made smaller than that before executing the step-up shift.

4. The control method for the continuously variable transmission according to claim 2, wherein
   a downshift amount when steplessly and continuously downshifting the target transmission ratio is set to a magnitude such that a ratio of an increase amount of the target engine rotation speed to an increase amount of a vehicle speed is smaller than a preset upper limit ratio.

5. A control apparatus for a continuously variable transmission, comprising:
   an acceleration request detecting unit that detects a magnitude of an acceleration request; and
   a controlling unit that controls a transmission ratio by switching from a first shift mode, in which a target transmission ratio is changed steplessly, to a second shift mode, which includes a stepwise change in the target transmission ratio, when the acceleration request exceeds a preset threshold value, wherein:
   the controlling unit is programmed to, when executing the second shift mode:
   set a target engine rotation speed according to the magnitude of the acceleration request,
   execute a step-down shift that lowers the target transmission ratio stepwise according to the target engine rotation speed at an acceleration start time, and
   retain the target engine rotation speed after the execution of the step-down shift for a predetermined period when executing the second shift mode; wherein:
   the predetermined period is a period until an actual engine rotation speed is converged to the target engine rotation speed, or a period from a start of the step-down shift until a predetermined time elapses after an actual transmission ratio due to the step-down shift reaches the target transmission ratio.

* * * * *